United States Patent
Patel et al.

(10) Patent No.: US 11,789,512 B2
(45) Date of Patent: Oct. 17, 2023

(54) INCREASED DATA STORAGE THROTTLING DURING POWER FAILURE

(71) Applicant: International Business Machines Corporation, Armonk, NY (US)

(72) Inventors: Kushal Patel, Pune (IN); Sandeep R. Patil, Pune (IN); Sarvesh Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 80 days.

(21) Appl. No.: 16/242,553

(22) Filed: Jan. 8, 2019

(65) Prior Publication Data
US 2020/0218325 A1    Jul. 9, 2020

(51) Int. Cl.
| | | |
|---|---|---|
| G06F 1/03 | (2006.01) | |
| G06F 1/3212 | (2019.01) | |
| G06F 1/3215 | (2019.01) | |
| G06F 9/44 | (2018.01) | |
| G06F 1/30 | (2006.01) | |

(52) U.S. Cl.
CPC .............. *G06F 1/30* (2013.01); *G06F 1/3212* (2013.01); *G06F 1/3215* (2013.01); *G06F 9/44* (2013.01)

(58) Field of Classification Search
CPC ........ G06F 1/30; G06F 1/3212; G06F 1/3215; G06F 9/44
See application file for complete search history.

(56) References Cited

U.S. PATENT DOCUMENTS

| | | | | |
|---|---|---|---|---|
| 7,062,675 | B1* | 6/2006 | Kemeny | G06F 11/1441 |
| | | | | 711/138 |
| 8,327,168 | B2* | 12/2012 | Winick | G06F 13/1668 |
| | | | | 713/340 |
| 10,304,501 | B1* | 5/2019 | Pardeik | G11C 11/406 |
| 2004/0193955 | A1* | 9/2004 | Leete | H04L 1/22 |
| | | | | 714/22 |
| 2005/0071550 | A1 | 3/2005 | Lowe et al. | |

(Continued)

FOREIGN PATENT DOCUMENTS

WO        2007018779 A1      2/2007

OTHER PUBLICATIONS

Li et al, "Power Attack Defense: Securing Battery-Backed Data Centers," 2016 ACM/IEEE 43rd Annual International Symposium on Computer Architecture (ISCA), pp. 493-505, © 2016 IEEE.

(Continued)

*Primary Examiner* — Phil K Nguyen
*Assistant Examiner* — Gayathri Sampath
(74) *Attorney, Agent, or Firm* — Jared L. Montanaro; Heather Johnston

(57) ABSTRACT

A processor may identify that an external power source has begun powering a computing device. The processor may identify computational data in a volatile memory of the computing device. The processor may determine that the external power source does not have sufficient energy capacity to provide the computing device enough power to process the computational data at a first I/O throttling rate. The processor may increase the first I/O throttling rate to a second I/O throttling rate. The second I/O throttling rate may allow the computational data to be processed by the computing device with the energy capacity of the external power source.

20 Claims, 6 Drawing Sheets

(56) References Cited

U.S. PATENT DOCUMENTS

| | | | |
|---|---|---|---|
| 2005/0071697 A1* | 3/2005 | Batchelor | G06F 11/1441 713/300 |
| 2006/0212651 A1 | 9/2006 | Ashmore | |
| 2007/0079152 A1* | 4/2007 | Winick | G06F 1/206 713/300 |
| 2010/0318821 A1* | 12/2010 | Kwan | G11C 8/16 713/320 |
| 2011/0010569 A1* | 1/2011 | Obr | G06F 1/30 713/320 |
| 2012/0331317 A1 | 12/2012 | Rogers et al. | |
| 2013/0124814 A1* | 5/2013 | Carter | G06F 12/08 711/169 |
| 2014/0173299 A1 | 6/2014 | McKnight et al. | |
| 2015/0089255 A1* | 3/2015 | Jurski | G06F 1/329 713/320 |
| 2015/0277542 A1* | 10/2015 | Chinnakkonda Vidyapoornachary | G06F 3/0647 713/323 |
| 2015/0347189 A1* | 12/2015 | Steffen | G06F 9/4881 718/103 |
| 2016/0085290 A1* | 3/2016 | Skandakumaran | G06F 1/329 713/320 |
| 2016/0118130 A1* | 4/2016 | Chadha | G11C 16/225 365/185.18 |
| 2018/0081417 A1 | 3/2018 | Chan et al. | |
| 2018/0188790 A1 | 7/2018 | Griffith et al. | |
| 2018/0267860 A1* | 9/2018 | Foster | G06F 12/0646 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

Narayanan et al., "Whole-system Persistence with Non-Volatile Memories," https://www.microsoft.com/en-us/research/publication/whole-system-persistence-with-non-volatile-memories/?from=http%3A%2F%2Fresearch.microsoft.com%2Fapps%2Fpubs%2Fdefault.aspx%3Fid%3D160853, Mar. 2012, Published by ACM, 3 pgs.

Techopedia, "What is In-Memory Computing?" https://www.techopedia.com/definition/28539/in-memory-computing, printed Dec. 3, 2018, 2 pgs.

* cited by examiner

INCREASED DATA STORAGE THROTTLING DURING POWER FAILURE

BACKGROUND

The present disclosure relates generally to the field of data storage, and more specifically to automatically storing data to persistent memory during a power failure.

Providing a continuous power supply to servers and other components in a datacenter is one of the major challenges in developing countries. Many server and storage providers utilize redundant power supplies that are connected to the servers and other components to help reduce the chances of sudden power loss. Nonetheless, if there is a sudden loss of power, data in volatile memory is likely to be lost if it is not properly stored before the redundant power supplies run out of back-up power.

SUMMARY

Embodiments of the present disclosure include a method, computer program product, and system for automatically storing data to persistent memory during a power failure. A processor may identify that an external power source has begun powering a computing device. The processor may identify computational data in a volatile memory of the computing device. The processor may determine that the external power source does not have sufficient energy capacity to provide the computing device enough power to process the computational data at a first I/O throttling rate. The processor may increase the first I/O throttling rate to a second I/O throttling rate. The second I/O throttling rate may allow the computational data to be processed by the computing device with the energy capacity of the external power source.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
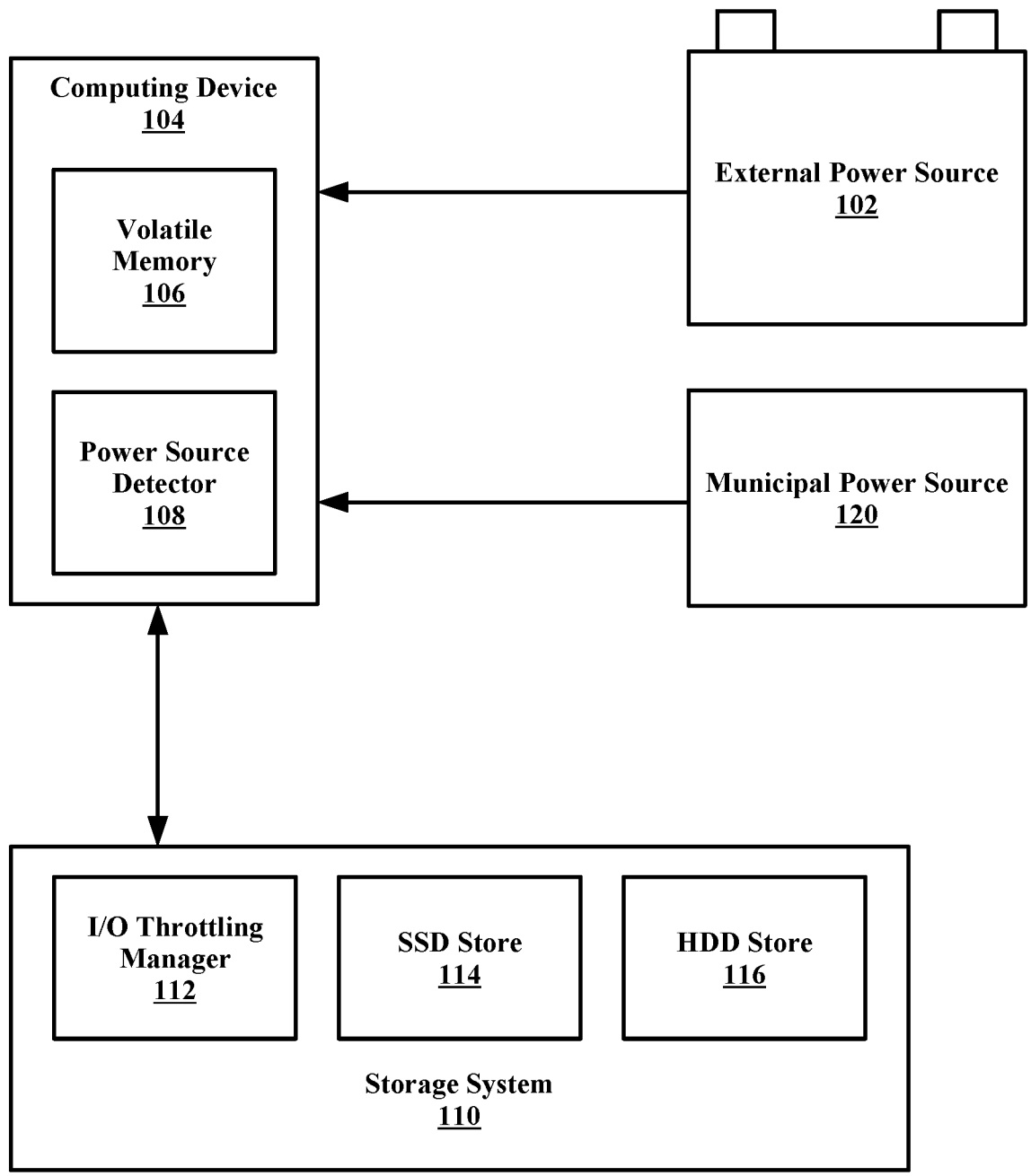
FIG. 1 illustrates an example system with an external power source, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of data storage, and more specifically to automatically storing data to persistent memory during a power failure. While the present disclosure is not necessarily limited to such applications, various aspects of the disclosure may be appreciated through a discussion of various examples using this context.

Many datacenters and storage companies prepare for power failures (e.g., by way of natural disasters, rolling blackouts, etc.) by attaching external power sources (e.g., backup batteries, generators, uninterruptible power supply, etc.). Nonetheless, data in a volatile memory (e.g., RAM, etc.) of a computing device may be hindered by throttling controls (e.g., software, application programming interfaces [APIs], rules, etc.) that slow the processing of the data by a server and/or in the computing device themselves. This in turn may prevent any data that is not processed by the server and/or computing device to be lost if the external power source loses its power, effectively shutting down the computing device.

As of now, there are no traditional and/or conventional means to augment and/or change throttling controls (e.g., in a networked server, in a datacenter, in a computing device networked to a cloud server, etc.), even in such a case as pending power failure. Still, in order to prevent the loss of data, a user may want to augment or remove throttling controls so that in the event of a power failure, a computing device can either effectively process the data in the volatile memory and/or store the data in non-volatile memory (e.g., persistent memory, ROM, etc.) for later processing.

Accordingly, in some embodiments, a processor may identify that an external power source has begun powering a computing device. The processor may identify computational data (e.g., an input/output (I/O) workload, numerical data, visual data, etc.) in a volatile memory of the computing device. The processor may determine that the external power source does not have a sufficient energy capacity to provide the computing device enough power to process the computational data at a first I/O throttling rate. The processor may increase the first I/O throttling rate to a second I/O throttling rate. In some embodiments, increasing the first I/O throttling rate to the second I/O throttling rate may include removing all throttling controls from the computing device or selectively choosing a level at which to remove and/or change throttling rates (e.g., at a volume-level, LUN-level, disk-level, or disk-group level throttling). The second I/O throttling rate may allow the computational data to be processed by the computing device with the energy capacity of the external power source.

For example, a desktop computer may be doing mathematical computations in its RAM when a thunderstorm disrupts the municipal power supply that is powering the desktop. A back-up power source may begin powering the desktop, and the desktop (e.g., or processor in the desktop) may identify that it is now being powered by the back-up power source. Upon the desktop identifying that it is being powered by the back-up power source, the desktop may take inventory (e.g., count, etc.) of the remaining mathematical computations needed to be completed and identify that 10 iterations of a complex equation need to be processed by the desktop.

The desktop (e.g., or a processor/controller/etc. in the desktop) may determine that the back-up power source has 1000 mAh energy capacity left, however, the power needed by the desktop to process the 10 iterations is 1200 mAh. The desktop may then increase the throttling rate of the RAM to process each of the iterations prior to exhausting the 1000 mAh back-up power source, thus allowing the desktop to finish its mathematical computations before losing power. In some embodiments, the desktop may increase the throttling rate of the RAM by removing a partition wall or volume in the RAM (e.g., if the RAM incorporates one or more virtual machines) or by processing multiple iterations in parallel (e.g., iteration 1 and 2 at the same time, iterations 3 and 4, etc.).

In some embodiments, if one or more virtual machines are incorporated into the computing device, a second I/O throttling rate may be determined for each of the one or more virtual machines so as to have each of the virtual machines flush its computational data before the computing device loses power.

In some embodiments, the second I/O throttling rate may be determined to be a rate at which the computational data may be processed in addition to allowing enough power for the external power source to safely shutdown the computing device. In some embodiments, it may be determined that the second I/O throttling rate may not be able to process the computational data before the external power source exhaust the power needed to power the computing device (e.g., it would take 1 Gbps throughput to finish the I/O transactions, but the max that can be done is only 500 Mbps) and the computing device may prioritize/rank each of the computational data, as discussed below, so as to have more relevant/valuable/important information saved before the external power source can no longer power the computing device.

In some embodiments, when determining that the external power source does not have sufficient energy capacity to provide the computing device enough power to process the computational data at a first I/O throttling rate, the processor may receive an external power signal. The processor may identify (e.g., from the external power signal) the energy capacity of the external power source. The processor may identify the first I/O throttling rate for the computing device. The processor may compute a first time that is associated with how long the energy capacity will allow the processing of the computational data at the first I/O throttling rate.

For example, as soon as an external power source begins powering a computing device, the external power source may send a signal to the computing device that indicates that the computing device is now powering the computing device and how much power capacity the external power source contains. The computing device may the identify that it is limited to a throttle limit of 60 megabytes of data per second when processing and/or transferring information. The computing device may then use the external power source's energy capacity and the throttle limit to determine how much of an computational data the computing device can process/transfer before losing power from the external power source.

Furthering the example, the computational data of the computing device at the time the external power source takes over powering the computing device may be 8 gigabytes of data. The computing device may then determine that it requires 1000 mAh of energy capacity and 90 minutes to process all of the 8 gigabytes. The computing device may then determine that the external power source only has 900 mAh energy capacity and that at the current throttle limit that only 7.75 gigabytes of the data can be processed, thus the throttle limit should be increased or data may be lost if the external power source loses all energy capacity.

In some embodiments, increasing the first I/O throttle rate to the second I/O throttle rate may include generating an application program interface (API) that is associated with a second I/O throttling rate. The API may replace an ancestor API that is associated with the first I/O throttling rate. For example, a server may have an original (e.g., first, ancestor, etc.) throttle rate that limits a computing device accessing a system API more that 5 times. However, after it is indicated that the computing device is running on external (e.g., auxiliary, emergency, etc.) power, the computing device and/or the server may generate a new (e.g., second, legacy, etc.) API that incorporates with the system API and that overrides the original throttle rate and indicates the computing device is now allowed to access the system API more than 5 times. In some embodiments, the new API may include a time limit equal to a computed amount of time needed to access the system API for processing the data in/on the computing device (e.g., the new API is automatically deleted after 60 mins).

In some embodiments, the processor may transfer the computational data in the volatile memory to a non-volatile memory of the computing device. The processor may identify that the computational data has been completely transferred from the volatile memory to the non-volatile memory. The processor may power down the computing device in response to identifying that the computational data has been completely transferred.

For example, a server may identify that there is 10 gigabytes of data in RAM when a power outage occurs and an auxiliary power source takes over the powering needs of the server. The server may, automatically, begin flushing (e.g., transferring, etc.) the 10 gigabytes of data to a hard drive (e.g., or flash memory) at a second (e.g., increased, augmented, etc.) throttle rate in order to assure that all 10 gigabytes are flushed before auxiliary power is lost. The server may then identify that all of the data has been flushed to ROM and turn off. In some embodiments, the server may flush the data from RAM to ROM and turn off as opposed to processing the data in order to preserve (e.g., protect, etc.) the data and to preserve the auxiliary power source in case a more urgent need for the server arises during the power outage.

In some embodiments, the processor may identify that a primary power source (e.g., municipal power, solar power, etc.) has begun powering the computing device. The processor may power on the computing device in response to identifying the primary power source has begun powering the computing device. The processor may transfer the computational data back to the volatile memory from the non-volatile memory. The processor may (or the processor may trigger the computing device to) begin processing the computational data in the volatile memory. The processing of the computational data is done based on the first I/O throttling rate.

Following the example above, a processor in the server may identify that municipal power is now feeding a power supply to the server and the processor may turn the server on (e.g., activating all virtual machines, RAM, ROM, other processors, functionalities, etc.). The server may begin, automatically, transferring the 10 gigabytes of data back from ROM to RAM. The server may then begin, automatically, processing the data at its normal I/O throttle rate. The server may begin processing the data at its normal I/O throttle rate because of the municipal (e.g., primary) power source being restored and there no longer being a need for expedited data transfer and/or processing.

In some embodiments, transferring the computational data in the volatile memory to the non-volatile memory of the computing device may include the processor analyzing the computational data, where the computational data includes one or more I/O requests. The processor may rank each of the one or more I/O requests. The processor may transfer each of the one or more I/O requests based on each of the one or more I/O requests' respective ranks.

For example, when a computer identifies that auxiliary power is now powering it, the computer may analyze each I/O request in its RAM that needs to be processed. The computer may rank each of the I/O requests depending on relative importance. For instance, the computer may identify key indicators/triggers that indicate that an I/O request has a key functionality for the computer (e.g., an operating system update, security update, etc.) and rank said I/O request above an I/O request with an indicator that indicates that an I/O request is a passive background program (e.g., a weather application, a clock widget, etc.). The computer may then transfer the key functionality I/O requests from the RAM to the ROM before the passive I/O requests.

In some embodiments, ranking each of the one or more I/O requests may include the processor identifying a data size for each of the one or more I/O requests. The processor may determine, based on the data size, an amount of bandwidth to be taken by the processing of each of the one or more I/O requests. For example, a server may identify that a first I/O request takes up 1 gigabyte of data, a second I/O request takes up 100 megabytes, and a third I/O request takes up 4 gigabytes of data. The server may determine that it is more efficient to transfer the second I/O request first, the first I/O request second, and the third I/O request last. The server may decide this because more complete I/O requests (e.g., the first and second I/O requests) can be transferred to non-volatile memory in a shorter amount of time than it would take just one (e.g., the third) I/O request (e.g., better quantity of data saved in non-volatile memory in-case of a power shortage).

Referring now to FIG. 1, illustrated is an example system 100 with an external power source 102, in accordance with embodiments of the present disclosure. In some embodiments, the system 100 includes the external power source 102, a computing device 104, a storage system 110, and a municipal power source 120. The computing device 104 includes a volatile memory 106 and a power source detector 108. The storage system 110 includes and I/O throttling manager 112, a solid state drive (SSD) store 114, and a hard disk drive (HDD) store 116. In some embodiments, the storage system 110 may be a cloud storage system, a server, and/or a component of the computing device 104

In some embodiments, the power source detector 108 detects that the municipal power source 120 has stopped powering the computing device 104 and/or that the external power source 102 has begun powering the computing device 104. In some embodiments, the power source detector 108 sends a signal to a controller (not shown in FIG. 1) in the computing device 104. In some embodiments, the signal indicates to the computing device 104, that the computing device 104 should identify (e.g., count, take inventory of, etc.) I/O requests (e.g., an computational data) in the volatile memory 106 at the time that the external power source 102 began powering the computing device 104. In some embodiments, the power source detector 108 additionally identifies the amount of energy capacity held in the external power source 102.

The computing device 104, after identifying an amount of I/O requests in the volatile memory 106, then communicates that amount with the storage system 110. In some embodiments, the computing device 104, by way of the power source detector 108, additionally communicates the amount of energy capacity held in the external power source 102 to the storage system 110.

In some embodiments, the storage system 110 relays information regarding the amount of I/O requests in the volatile memory 106 and the amount of energy capacity in the external power source 102 to the I/O throttling manager 112. In some embodiments, the I/O throttling manager 112 identifies a preset (e.g., firmware based, API based, upload/download speed based, etc.) throttling rate at which information (e.g., I/O requests) from the computing device 104 can be transferred to and/or by the storage system 110. In some embodiments, the I/O throttling manager 112 identifies a preset throttling rate at which information from the computing device 104 can be processed by the storage system 110.

In some embodiments, the I/O throttling manager uses the information regarding the amount of I/O requests in the volatile memory 106, the amount of energy capacity in the external power source 102, and the preset throttling rate to compute an amount of time it would take to transfer and/or process each of the I/O requests in the volatile memory 106 at the current preset throttling rate.

In some embodiments, the I/O throttling manager 112 determines that the amount of time to transfer and/or process each of the I/O requests in the volatile memory 106 at the current present throttling rate is unachievable (e.g., the external power source 102 has enough energy capacity to keep the computing device 104 powered from 1 hour, but the I/O requests require 90 minutes to be transferred and/or processed by the storage system 110 at the current preset I/O throttling rate).

The I/O throttling manager 112 then generates a new I/O throttling rate (e.g., by replacing an API, replacing/augmenting a rule, etc.) that will allow the I/O requests in the volatile memory 106 to be transferred/processed in the storage system 110 within an amount of time that the external power source 102 can continue powering the computing device 104.

In some embodiments, the I/O throttling manager 112, after augmenting the I/O throttling rate and/or after identifying that each I/O request from the volatile memory 106 has been transferred and/or processed by the storage system 110, directs each of the I/O requests to either the SSD store 114 or the HDD store 116 in order to rebalance the load of the storage system 110. This ensures that the storage system 110 continues to work properly after the sudden influx of I/O requests to the storage system 110.

Figure 2:
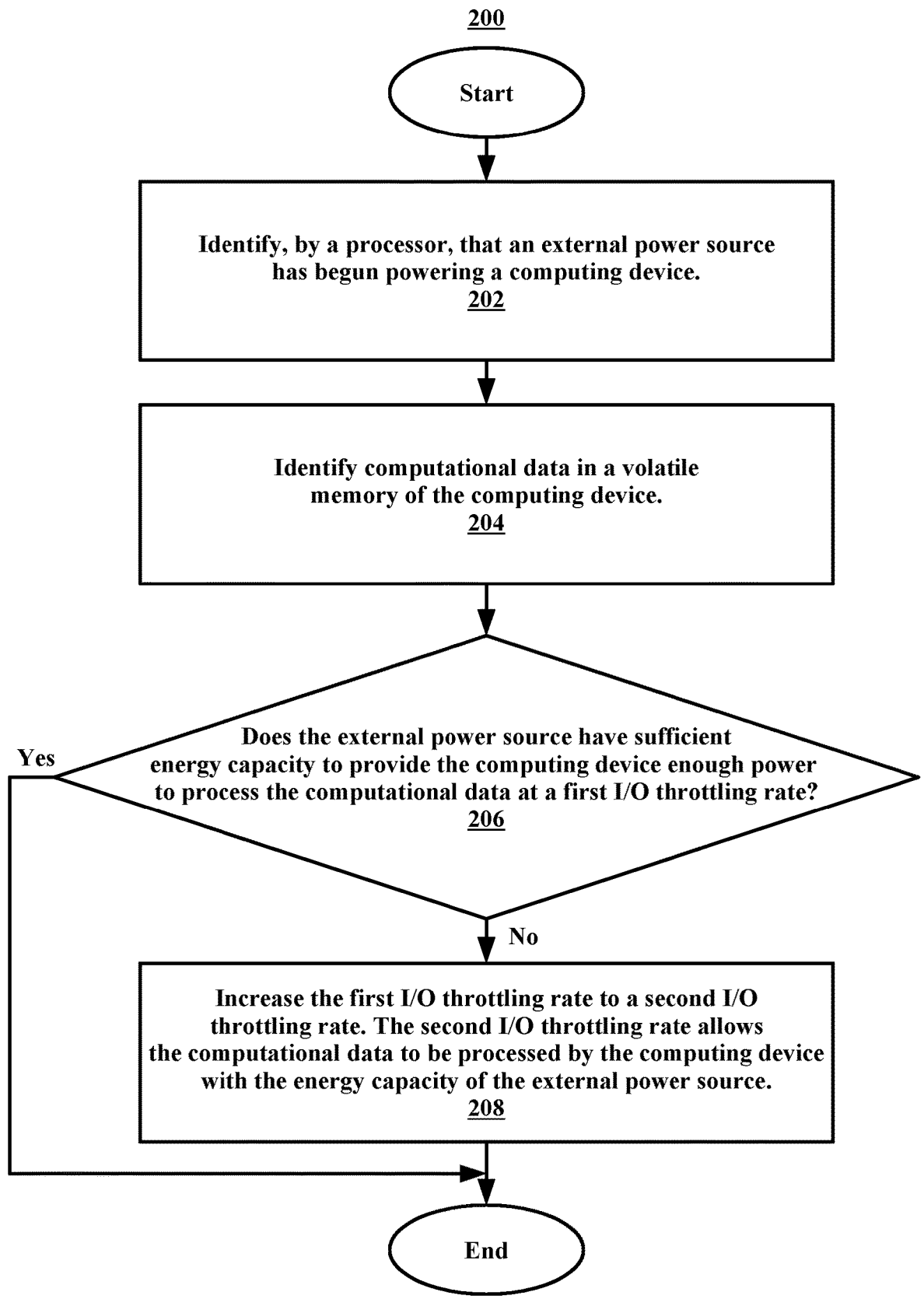
FIG. 2 illustrates a flowchart of an example method for increasing a throttling rate of computational data, in accordance with embodiments of the present disclosure.

Referring now to FIG. 2, illustrated is a flowchart of an example method 200 for increasing a throttling rate of an computational data, in accordance with embodiments of the present disclosure. In some embodiments, the method 200 may be performed by a processor, a computer, a server, etc.

In some embodiments, the method 200 begins at operation 202 where a processor identities that an external power source has begun powering a computing device (e.g., a computer, a server, etc.). In some embodiments, the method 200 proceeds to operation 204.

At operation 204, the processor identifies an computational data in a volatile memory of the computing device. In some embodiments, the method 200 proceeds to decision block 206. At decision block 206, it is determined if the external power source has an energy capacity (e.g., a sufficient energy capacity) that is required to provide the computing device enough power to process the computational data at a first I/O throttling rate.

If, at decision block 206, it is determined that the external power source does have the energy capacity required to provide the computing device enough power to process the computational data at a first I/O throttling rate, the method 200 ends.

If, at decision block 206, it is determined that the external power source does not have the energy capacity required to provide the computing device enough power to process the computational data at a first I/O throttling rate, the method 200 proceeds to operation 208.

At operation 208, the processor increases the first I/O throttling rate to a second I/O throttling rate. The second I/O throttling rate allows the computational data to be processed by the computing device with the energy capacity of the external power source. In some embodiments, the method 200 ends.

For example, the computing device in communication with a cloud computing server may have an upload limit of 60 megabytes per second, however, the computing device may indicate to the cloud computing server that it has had a power failure and is running on reserve power. The computing device may indicate that it has 40 gigabytes of data to upload to the cloud computing server, but that it will run out of reserve power before the 40 gigabytes of data can be uploaded if the current upload limit is abided.

The cloud computing server and/or the computing device may generate a code-change that allows the upload limit to increase to 120 megabytes per second for the duration of transferring the 40 gigabytes of data to the cloud computing server, thus allowing the data to be transferred and stored (and/or processed) in the cloud computing server before being lost on the computing device by power failure. It is noted that the method presently disclosed provides a process to increase the transferring/computing speed of computing devices and improves the transferring/computing speeds of computing devices during power failure situations.

Figure 3:
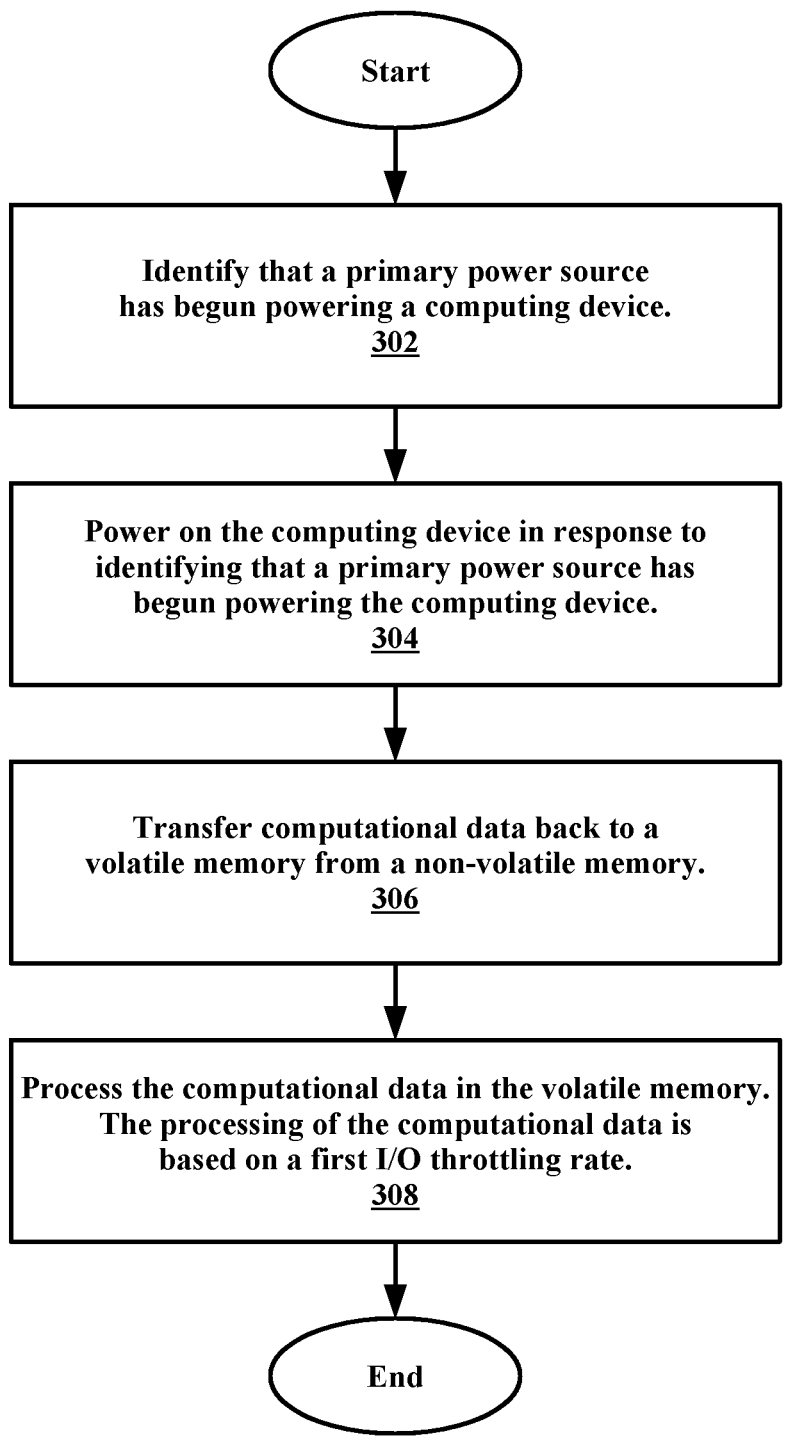
FIG. 3 illustrates a flowchart of an example method for transferring computational data back to a volatile memory, in accordance with embodiments of the present disclosure.

Referring now to FIG. 3, illustrated is a flowchart of an example method 300 for transferring an computational data back to a volatile memory, in accordance with embodiments of the present disclosure. In some embodiments, the method 300 may be performed by a processor, a computer, a server, etc. In some embodiments, the method 300 may be a continuation of the method 200 of FIG. 2 and/or may begin after an computational data has been transferred from volatile memory to non-volatile memory in order to protect the computational data during a power related failure (e.g., issue, etc.).

In some embodiments, the method 300 begins at operation 302. At operation 302, a processor identifies that a primary power source (e.g., municipal power) has begun powering a computing device. In some embodiments, the computing device may be the same computing device as discussed above in regard to FIG. 2.

In some embodiments, the method 300 proceeds to operation 304. At operation 304, the processor powers on the computing device in response to identifying that a primary source has begun powering the computing device. In some embodiments, the method 300 proceeds to operation 306.

At operation 306, the processor transfers an computational data back to the volatile memory from a non-volatile memory. In some embodiments, the method 300 proceeds to operation 308. At operation 308, the processor processes the computational data in the volatile memory. The processing of the computational data is based on a first I/O throttling rate. In some embodiments, the method 300 ends.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
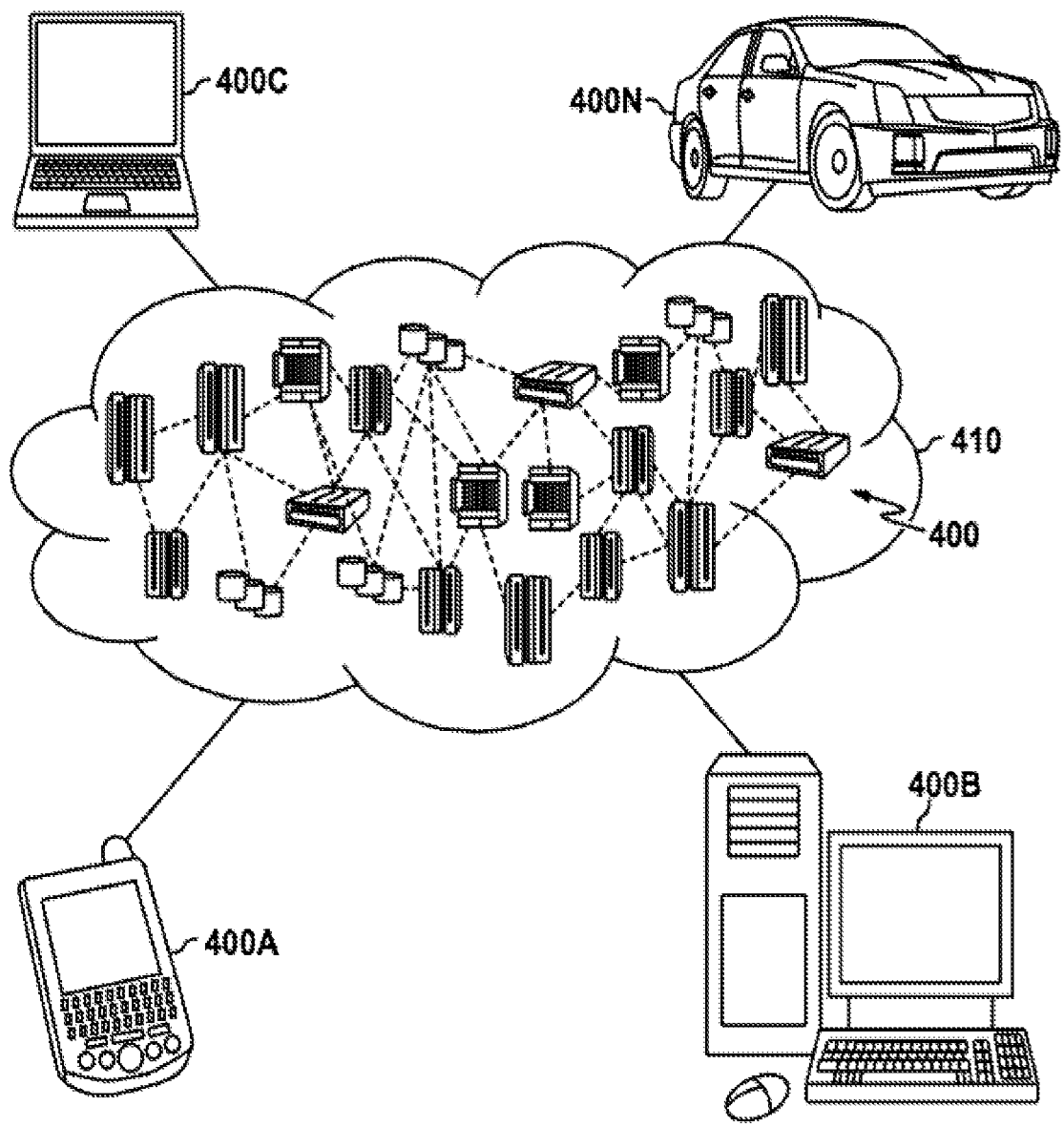
FIG. 4 depicts a cloud computing environment, in accordance with embodiments of the present disclosure.

Referring now to FIG. 4, illustrative cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof. This allows cloud computing environment 410 to offer infrastructure, platforms and/or software as services for which a cloud consumer does not need to maintain resources on a local computing device. It is understood that the types of computing devices 400A-N shown in FIG. 4 are intended to be illustrative only and that computing nodes 400 and cloud computing environment 410 can communicate with any type of computerized device over any type of network and/or network addressable connection (e.g., using a web browser).

Figure 5:
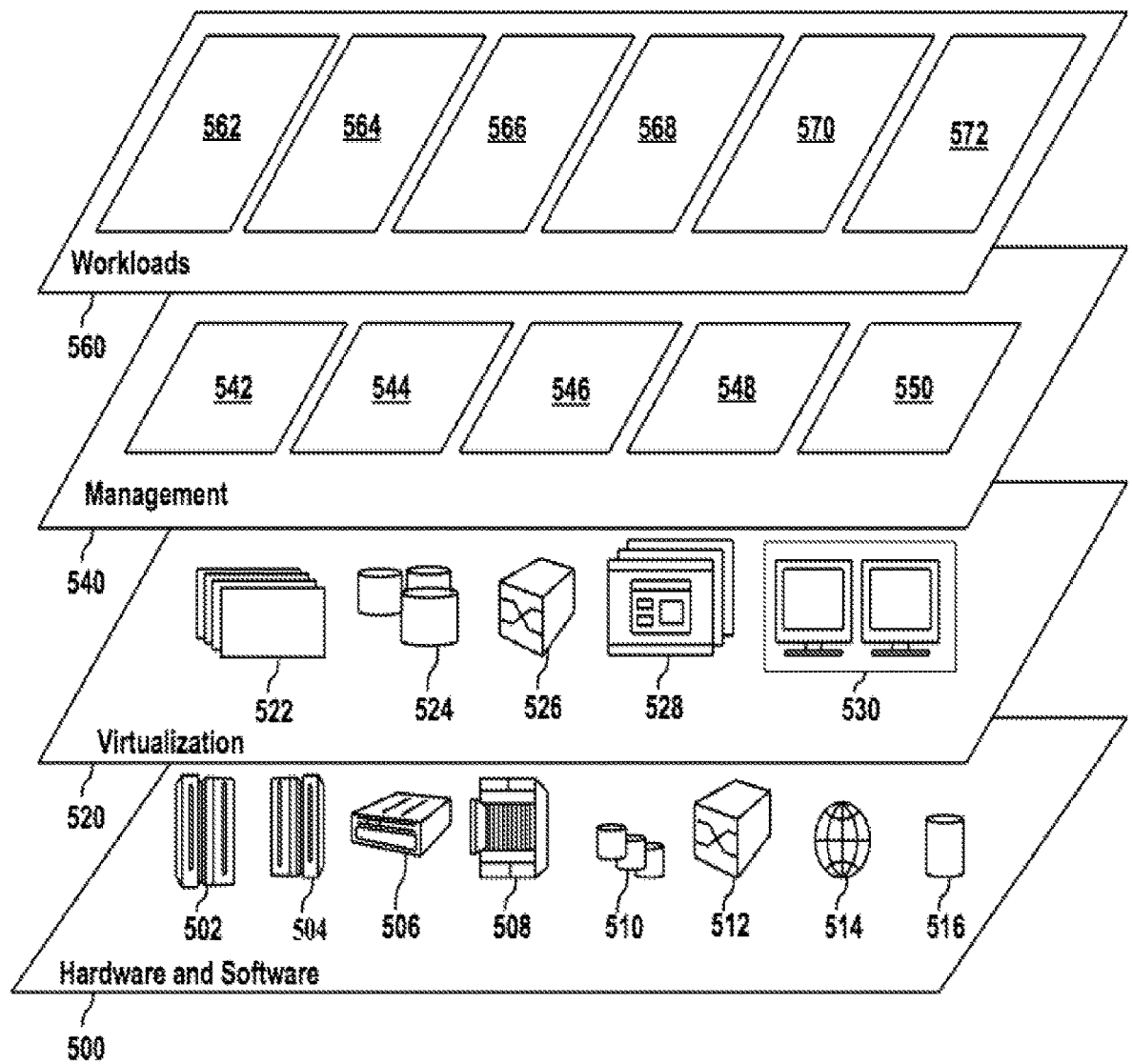
FIG. 5 depicts abstraction model layers, in accordance with embodiments of the present disclosure.

Referring now to FIG. 5, a set of functional abstraction layers provided by cloud computing environment 410 (FIG. 4) is shown. It should be understood in advance that the components, layers, and functions shown in FIG. 5 are intended to be illustrative only and embodiments of the disclosure are not limited thereto. As depicted below, the following layers and corresponding functions are provided:

Hardware and software layer 500 includes hardware and software components. Examples of hardware components include: mainframes 502; RISC (Reduced Instruction Set Computer) architecture based servers 504; servers 506; blade servers 508; storage devices 510; and networks and networking components 512. In some embodiments, software components include network application server software 514 and database software 516.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 540 may provide the functions described below. Resource provisioning 542 provides dynamic procurement of computing resources and other resources that are utilized to perform tasks within the cloud computing environment. Metering and Pricing 544 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 546 provides access to the cloud computing environment for consumers and system administrators. Service level management 548 provides cloud computing resource allocation and management such that required service levels are met. Service Level Agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment may be utilized. Examples of workloads and functions which may be provided from this layer include: mapping and navigation 562; software development and lifecycle management 564; virtual classroom education delivery 566; data analytics processing 568; transaction processing 570; and I/O throttling 572.

Figure 6:
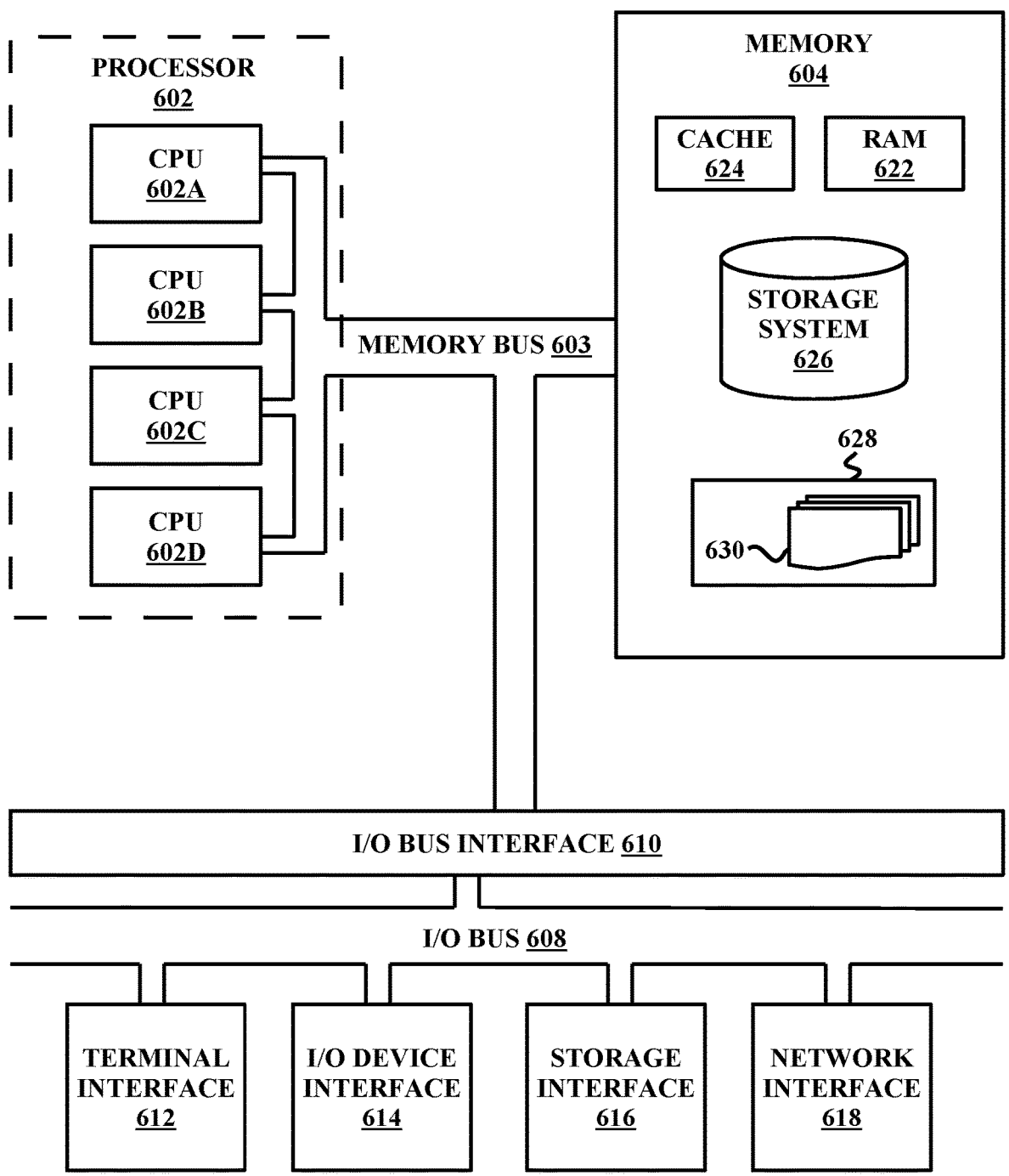
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 601 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smartphone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
   identifying, by a processor, that a primary power source has stopped powering a computing device and that an external power source has begun powering the computing device;
   identifying computational data in a volatile memory of the computing device; detecting a first I/O throttling rate associated with one or more virtual machines in the volatile memory;
   determining that the external power source does not have sufficient energy capacity to provide the computing device enough power to process the computational data at the first I/O throttling rate associated with the one or more virtual machines in the volatile memory;
   selecting a second I/O throttling rate based on the determination that the second I/O throttling rate allows the computational data to be processed to completion in the volatile memory by the computing device with the energy capacity of the external power source and that the second I/O throttling rate allows the computational data to be transferred from the volatile memory to a non-volatile memory with the energy capacity of the external power source;
   in response to determining that the external power source does not have sufficient energy capacity to provide the computing device enough power to process the computational data to completion in the volatile memory at the first I/O throttling rate, increasing the first I/O throttling rate to the second I/O throttling rate;
   processing the computational data to completion in the volatile memory at the second I/O throttling rate; and
   transferring the computational data from the volatile memory to the non-volatile memory of the computing device at the second I/O throttling rate.

2. The method of claim 1, wherein determining that the external power source does not have sufficient energy capacity to provide the computing device enough power to process the computational data at the first I/O throttling rate comprises:
   receiving an external power signal;
   identifying the energy capacity of the external power source; identifying the first I/O throttling rate for the computing device; and
   computing a first time that is associated with how long the energy capacity will allow the processing of the computational data at the first I/O throttling rate.

3. The method of claim 1, wherein increasing the first I/O throttling rate to the second I/O throttling rate comprises:

generating an application program interface (API), wherein the API is associated with the second I/O throttling rate; and replacing an ancestor API with the API, wherein the ancestor API is associated with the first I/O throttling rate.

4. The method of claim 1, further comprising:

identifying that the computational data has been completely transferred from the volatile memory to the non-volatile memory; and powering down the computing device in response to identifying that the computational data has been completely transferred.

5. The method of claim 4, further comprising:

identifying that the primary power source has begun powering the computing device;

powering on the computing device in response to identifying the primary power source has begun powering the computing device;

transferring the computational data back to the volatile memory from the non-volatile memory; and processing the computational data in the volatile memory, wherein the processing of the computational data is done based on the first I/O throttling rate.

6. The method of claim 4, wherein transferring the computational data in the volatile memory to the non-volatile memory of the computing device comprises:

analyzing the computational data, wherein the computational data includes one or more I/O requests;

identifying an I/O request of the one or more I/O requests having an indicator indicating that the I/O request is associated with a background program;

ranking each of the one or more I/O requests, wherein the I/O request associated with the background program is ranked last; and transferring each of the one or more I/O requests based on each of the one or more I/O requests respective rank.

7. The method of claim 6, wherein ranking each of the one or more I/O requests comprises:

identifying a data size for each of the one or more I/O requests; and determining, based on the data size, an amount of bandwidth to be taken by the processing of each of the one or more I/O requests.

8. A system comprising: a memory; and a processor in communication with the memory, the processor being configured to perform operations comprising:

identifying, that a primary power source has stopped powering a computing device and that an external power source has begun powering the computing device;

identifying computational data in a volatile memory of the computing device; detecting a first I/O throttling rate associated with one or more virtual machines in the volatile memory;

determining that the external power source does not have sufficient energy capacity to provide the computing device enough power to process the computational data at the first I/O throttling rate associated with the one or more virtual machines in the volatile memory;

selecting a second I/O throttling rate based on the determination that the second I/O throttling rate allows the computational data to be processed to completion in the volatile memory by the computing device with the energy capacity of the external power source and that the second I/O throttling rate allows the computational data to be transferred from the volatile memory to a non-volatile memory with the energy capacity of the external power source;

in response to determining that the external power source does not have sufficient energy capacity to provide the computing device enough power to process the computation data to completion in the volatile memory at the first I/O throttling rate, increasing the first I/O throttling rate to the second I/O throttling rate;

processing the computational data to completion in the volatile memory at the second I/O throttling rate; and transferring the computational data from the volatile memory to the non-volatile memory of the computing device at the second I/O throttling rate.

9. The system of claim 8, wherein determining that the external power source does not have sufficient energy capacity to provide the computing device enough power to process the computational data at the first I/O throttling rate comprises:

receiving an external power signal;

identifying the energy capacity of the external power source; identifying the first I/O throttling rate for the computing device; and computing a first time that is associated with how long the energy capacity will allow the processing of the computational data at the first I/O throttling rate.

10. The system of claim 8, wherein increasing the first I/O throttling rate to the second I/O throttling rate comprises:

generating an application program interface (API), wherein the API is associated with the second I/O throttling rate; and replacing an ancestor API with the API, wherein the ancestor API is associated with the first I/O throttling rate.

11. The system of claim 8, wherein the operations further comprise:

identifying that the computational data has been completely transferred from the volatile memory to the non-volatile memory; and powering down the computing device in response to identifying that the computational data has been completely transferred.

12. The system of claim 11, wherein the operations further comprise: identifying that the primary power source has begun powering the computing device;

powering on the computing device in response to identifying the primary power source has begun powering the computing device;

transferring the computational data back to the volatile memory from the non-volatile memory; and processing the computational data in the volatile memory, wherein the processing of the computational data is done based on the first I/O throttling rate.

13. The system of claim 11, wherein transferring the computational data in the volatile memory to the non-volatile memory of the computing device comprises:

analyzing the computational data, wherein the computational data includes one or more I/O requests;

identifying an I/O request of the one or more I/O requests having an indicator indicating that the I/O request is associated with a background program;

ranking each of the one or more I/O requests associated with the background program is ranked last; and transferring each of the one or more I/O requests based on each of the one or more I/O requests respective rank.

14. The system of claim 13, wherein ranking each of the one or more I/O requests comprises:

identifying a data size for each of the one or more I/O requests; and determining, based on the data size, an amount of bandwidth to be taken by the processing of each of the one or more I/O requests.

15. A computer program product comprising a computer readable storage medium having program instructions embodied therewith, the program instructions executable by a processor to cause the processor to perform a method, the method comprising:
  identifying that a primary power source has stopped powering a computing device and that an external power source has begun powering the computing device;
  identifying computational data in a volatile memory of the computing device; detecting a first I/O throttling rate associated with one or more virtual machines in the volatile memory;
  determining that the external power source does not have sufficient energy capacity to provide the computing device enough power to process the computational data at the first I/O throttling rate associated with the one or more virtual machines in the volatile memory;
  selecting a second I/O throttling rate based on the determination that the second I/O throttling rate allows the computational data to be processed to completion in the volatile memory by the computing device with the energy capacity of the external power source and that the second I/O throttling rate allows the computational data to be transferred from the volatile memory to a non-volatile memory with the energy capacity of the external power source;
  increasing the first I/O throttling rate to the second I/O throttling rate in response to determining that the external power source does not have sufficient energy capacity to provide the computing device enough power to process the computation data to completion in the volatile memory at the first I/O throttling rate, increasing the first I/O throttling rate to the second I/O throttling rate;
  processing the computational data to completion in the volatile memory at the second I/O throttling rate; and
  transferring the computational data from the volatile memory to the non-volatile memory of the computing device at the second I/O throttling rate.

16. The computer program product of claim 15, wherein determining that the external power source does not have sufficient energy capacity to provide the computing device enough power to process the computational data at the first I/O throttling rate comprises:
  receiving an external power signal;
  identifying the energy capacity of the external power source; identifying the first I/O throttling rate for the computing device; and
  computing a first time that is associated with how long the energy capacity will allow the processing of the computational data at the first I/O throttling rate.

17. The computer program product of claim 15, wherein increasing the first I/O throttling rate to the second I/O throttling rate comprises:
  generating an application program interface (API), wherein the API is associated with the second I/O throttling rate; and
  replacing an ancestor API with the API, wherein the ancestor API is associated with the first I/O throttling rate.

18. The computer program product of claim 15, further comprising:
  identifying that the computational data has been completely transferred from the volatile memory to the non-volatile memory; and
  powering down the computing device in response to identifying that the computational data has been completely transferred.

19. The computer program product of claim 18, further comprising: identifying that the primary power source has begun powering the computing device;
  powering on the computing device in response to identifying the primary power source has begun powering the computing device;
  transferring the computational data back to the volatile memory from the non-volatile memory; and
  processing the computational data in the volatile memory, wherein the processing of the computational data is done based on the first I/O throttling rate.

20. The computer program product of claim 18, wherein transferring the computational data in the volatile memory to the non-volatile memory of the computing device comprises:
  analyzing the computational data, wherein the computational data includes one or more I/O requests;
  identifying an I/O request of the one or more I/O requests having an indicator indicating that the I/O request is associated with a background program;
  ranking each of the one or more I/O requests, wherein the I/O request associated with the background program is ranked last; and
  transferring each of the one or more I/O requests based on each of the one or more I/O requests respective rank.

* * * * *